3,848,010
CATALYTIC VINYLATION OF AROMATIC
COMPOUNDS
George M. Intille, St. Louis, Mo., assignor to Monsanto
Company, St. Louis, Mo.
No Drawing. Filed Aug. 1, 1972, Ser. No. 277,003
Int. Cl. C07c 3/52, 15/10, 15/14
U.S. Cl. 260—668 R
6 Claims

ABSTRACT OF THE DISCLOSURE

Aromatic compounds are selectively coupled with olefins by reacting the two compounds in the presence of a catalyst system comprising a Group VIII metal or metal compound and a mercury, thallium or lead compound. The foregoing reaction is preferably conducted under conditions which are capable of reoxidizing the Group VIII metal to its higher oxidation state.

BACKGROUND OF THE INVENTION

This invention pertains to the coupling of aromatic compounds and olefins to produce olefinically substituted aromatic compounds such as styrene.

Present commercial processes for producing styrene proceed in two steps. The first step is the alkylation of benzene with ethylene to form ethylbenzene. In the second step the ethylbenzene is dehydrogenated in the presence of steam. The elimination of intermediate ethylbenzene production in the production of styrene would represent an important advance in the art if it resulted in good yields of styrene.

The direct oxidative coupling of olefins and aromatics in the presence of stoichiometric quantities of Group VIII metal salts has been demonstrated by prior art workers. But the difficulty of carrying out the reaction and the expense of the Group VIII metal salt which is consumed, in addition to poor yields of product, have prevented the process from becoming commercially valuable. Attempts have been made to develop a one-step process for producing olefinically substituted aromatic compounds in the presence of a Group VIII metal compound wherein the process is catalytic with respect to the Group VIII metal compound. Prior to the process of this invention, the attempts have resulted only in reactions which are either too non-selective or too slow to be commercially useful.

SUMMARY OF THE INVENTION

Providing a process for coupling olefins with aromatic compounds in one step by carrying out the coupling reaction in good yield in the presence of a catalytic amount of a Group VIII metal compound constitutes a principal object of this invention. Providing a Group VIII metal catalyst system for the above reaction where the Group VIII metal is continuously regenerated to its active catalytic state in the reaction medium constitutes another principal object of this invention.

The present invention comprises a process for coupling an aromatic compound having a hydrogen atom attached to an aromatic ring with an olefinic compound having a hydrogen atom attached to a doubly bonded carbon atom comprising reacting said aromatic and said olefinic compounds in the presence of a Group VIII metal or metal compound and a mercury, thallium or lead compound. The above process is of particular value in preparing compounds such as styrene and stilbene.

DESCRIPTION OF PREFERRED EMBODIMENTS

Aromatic compounds useful in the present invention must have at least one hydrogen atom attached to a carbon atom in an aromatic ring. Benzene and substituted benzenes constitute one preferred group of suitable aromatic compounds. The substituents on the benzene ring can number from none to as many as five. Suitable substituents include monovalent hydrocarbon groups such as alkyl, cycloalkyl, aryl, aralkyl, alkaryl, alkenyl and alkynyl groups, carboxyalkyl, acyloxy, halogen such as chloro and bromo groups, halo-substituted hydrocarbons, nitro, hydroxy, alkoxy such as methoxy and decyloxy, aryloxy, cyano, amino, nitroso, amido and other substituent groups which do not adversely affect the coupling reaction. The number of carbon atoms in the foregoing hydrocarbon substituent groups can be any number up to 20 or more but as a practical matter will seldom total more than 12 and usually not more than six carbon atoms. Representative hydrocarbon and hydrocarbonoxy R groups are methyl, ethyl, cyclohexyl, vinyl, allyl, phenyl, diphenyl, tolyl, xylyl, benzyl, phenylethyl, 2-ethylphenyl, formyl, acetyl, acetate, propionate, methoxy, decyloxy, phenoxy, tolyloxy and the like.

When one or more of the R groups are olefinic groups, the aromatic reactant may be similar to some of the products obtained in this reaction. For instance styrene is one reaction product obtained by this process, but styrene can also be a reactant which can be used to produce stilbene or divinylbenzene.

In addition to monoaromatic compounds, polyaromatic compounds can also be employed. Two of the most common condensed ring compounds are naphthalene and anthracene. As with the mono-aromatic compounds, the polyaromatics can be substituted with the same substituents set forth hereinabove. The number of substituents on the aromatic rings can be much larger because of the greater number of carbon atoms in the aromatic rings. In the case of naphthalene, the maximum number of substituents can be seven with at least one nuclear carbon atom containing a hydrogen atom attached directly thereto. Anthracene can have a maximum of nine substituents with at least one nuclear carbon atom containing a hydrogen atom attached directly thereto. Other polyaromatic compounds having more than three fused rings can of course have more substituents with the only restriction being that there be at least one carbon atom in an aromatic ring having a hydrogen atom attached to it. Other condensed ring compounds include benzofuran, chlorobenzofuran and indene. Other well-known polyaromatic compounds useful herein include non-condensed ring compounds such as biphenyl, terphenyl, diphenylether and diphenylmethane. As with the previously mentioned aromatic compounds, the compounds can be substituted with substituents of the type earlier discussed as suitable, again with the restriction that there be at least one carbon atom in an aromatic ring which has a hydrogen atom attached to it. Examples of suitable compounds include benzene, toluene, xylene, 2-chloroxylene, bromobenzene, trichlorobenzene, styrene, methylvinylbenzene, p-dichlorobenzene, divinylbenzene, ethylbenzene, methylbenzoate, phenyl acetate, phenol, 2,3-dimethylphenol, nitrobenzene, aniline, 4-chlorophenyl acetate, phenylbenzoate, methoxybenzene, phenoxybenzene, phenyl hexanoate, anisole, tolylacetate, biphenyl, diphenylmethane, naphthalene, 1,2-dibromonaphthalene and anthracene.

Although as mentioned above, the number and type of substituents can vary considerably, the aromatic compounds most commonly used in the process of this invention will usually be monoaromatic and will have not more than two substituents attached to the benzene ring. Preferred substituents are alkyl and alkenyl groups having up to two carbon atoms. Preferred aromatic compounds therefore include benzene, toluene, xylene, methylethylbenzene, methylvinylbenzene, styrene, divinylbenzene and the like. Particularly preferred are monoaromatic compounds having no more than one alkyl or alkenyl group having up to two carbon atoms attached to the aromatic ring, i.e. benzene, toluene, ethylbenzene and styrene.

The second essential reactant in the process of this invention is the olefin. Any compound containing ethylenic unsaturation can be used if the compound contains at least one hydrogen atom attached to a doubly bonded carbon atom. The olefinic compounds can be in many forms. Ethylene and substituted ethylenes are one preferred class of olefins. They can be shown by the formula

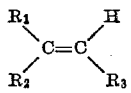

where the Rs are hydrogen, monovalent hydrocarbon groups such as alkyl, cycloalkyl, alkenyl, aryl, aralkyl and alkaryl groups, preferably having up to 12 carbon atoms; carboxyalkyl; acyloxy; hydroxy; alkoxy; aryloxy; halogen; halo-substituted hydrocarbons; nitro; cyano; amino; amido; nitroso and in general the same groups described as suitable for substitution on the aromatic rings of the aromatic compounds. Examples of olefinic compounds within the above class include ethylene, vinyl chloride, vinyl fluoride, vinylidene chloride, allyl bromide, propylene, butene-1, butene-2, the pentenes, 2-methylbutene-2, 1,5-heptadiene, divinylbenzene, the hexenes, the octenes, 4,4 dimethylnonene, the dodecenes, the eicosenes, styrene, p-chlorostyrene, benzylheptene, trichloroethylene, acrylic acid, crotonic acid, maleic acid, ethyl maleate, p-vinylbenzoic acid, vinyl acetate, allyl propionate, propenyl acetate, butenyl caproate, ethylidene diacetate, methyl acrylate, methyl methacrylate, divinyl benzene, and the like. Another class of olefins include the cycloolefins such as those of the formula

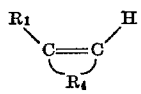

where $R_1$ is as previously described and $R_4$ is a divalent alkylene or substituted alkylene group having from about 2 to about 20 carbon atoms. Examples include cyclopentene, cyclohexene, vinylcyclohexene, allylcyclohexene, 1-chlorocyclohexene, methylcyclopentene and ethylcyclododecene. A third class of olefins useful herein have the formula

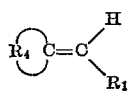

where $R_1$ and $R_4$ are as previously described. Examples of such compounds include methylenecyclohexane, ethylidenecycloheptane, propylidenecyclopentane and dodecylidenecyclooctane.

The reaction of this invention can be carried out using neat reactants or solutions or dispersions of the reactants. Many of the reactants such as benzene, toluene, xylene, ethylbenzene, phenol and others will be liquid under the reaction conditions employed whereas some highly substituted compounds and condensed ring compounds may be solid and can beneficially be reacted in a solution. Any solvents which do not interfere with the reaction or react with the product or reactant can be used. Suitable solvents include alcohols, carboxylic acids, sulfones, sulfoxides, amides, ketones, ethers, esters, acid halides, water and aromatic and aliphatic hydrocarbons. Preferred solvents are alcohols and carboxylic acids. Examples of solvents include methanol, ethanol, propanol, formic acid, acetic acid, propionic acid, butyric acid, benzoic acid, phthalic acid, methylethylsulfone, diisopropylsulfone, dimethylsulfoxide, ethylpropylsulfoxide, formamide, dimethylformamide, N-methylpyrolidone. acetamide, methylethylketone, acetone, diethylketone, ether, diethylether, diisopropylether, ethylene glycol, diglyme, ethyl formate, ethyl acetate, acetyl chloride, benzene, cyclohexane, isooctane and methylcyclohexane.

The catalyst system which is used herein is that feature of the invention responsible for coupling aromatic compounds and olefinic compounds to each other under the relatively mild reaction conditions employed. In its broadest aspects, the catalyst system comprises a mercury, thallium or lead compound together with a Group VIII metal compound.

The mercury, thallium or lead compound can be any compound which is soluble in a solvent capable of being used in the process of this invention. The mercury, thallium or lead compound is preferably supplied in its highest common oxidation state, i.e. +2 for mercury, +3 for thallium and +4 for lead. The metal compound can be recovered in this state at the end of the reaction. When oxidizing conditions are employed, compounds where the metal is in a lower oxidation state initially can also be used if they are capable of being oxidized to the preferred state during the reaction. Examples of suitable compounds include mercuric hydroxide, thallium methoxide, tetraethyl lead, halides such as mercuric chloride, thallic bromide and other salts such as lead sulfate, mercuric sulfite, thallic nitrate, lead phosphate, mercuric borate, thallic carbonate, lead fluorate, mercuric acetate and thallic propionate. Preferred are those salts containing an oxyanion such as nitrate, sulfate and carboxylate.

The Group VIII metal compounds which constitute another part of the catalyst system are those which contain a metal falling within Group VIII of the Periodic System of the Elements. The metals of Group VIII are iron, cobalt, nickel, ruthenium, rhodium, palladium, osmium, iridium, and platinum. Preferred metals of this group are ruthenium, rhodium, palladium, osmium, iridium and platinum. Particularly preferred are platinum and palladium. The metal can be supplied initially as the free metal if an oxidizing agent is also present. Alternatively, the metal can be supplied as a salt or complex. Throughout the remainder of this specification, the term "Group VIII metal compound" will be used to refer to both the free metal as well as to the salts and complex of the metal. The metal salts can contain any anion such as those already mentioned as suitable for the mercury, thallium and lead compounds. As with the mercuric compounds, Group VIII metal compounds containing an oxyanion are preferred. Examples of suitable compounds include nickel iodide, palladium bromide, platinum chloride, nickel nitrate, palladium sulfate, platinum acetate, nickel nitrate, palladium sulfate, platinum acetate, nickel formate, palladium propionate, platinum acetylacetonate and complexes of the metal ions with chelating agents such as citric acid, ethylenediaminetetraacetic acid and others. In addition to metal carboxylates such as palladium and platinum acetates and benzoates, the metal halogen-substituted carboxylates constitute another preferred class of Group VIII metal compounds. Examples include bis(trifluoroacetate) palladium, bis(chloroformate) platinum, and bis(chloroacetate) iridium.

When the reaction is carried out in the presence of only the mercury, thallium or lead compound and a stoichiometric amount of the Group VIII metal compound, the mercury, thallium or lead compound will function in a "catalytic" manner but the Group VIII metal compound will be reduced to the elemental metal. By "catalytic" it is meant that the component of the catalyst system is left in its originally active state at the end of the reaction. With no other oxidizing agent present to reconvert the Group VIII metal to its higher oxidation state, the reaction will terminate when the Group VIII metal compound is completely reduced. Using a quantity of Group VIII metal compound which is stochiometrically equivalent to the aromatic or olefinic compound therefore permits the reaction to go to completion. The above describes one embodiment of this invention.

In discussing Group VIII metal compound concentrations in amounts stoichiometrically equivalent to the reactants, the aromatic and olefinic reactants are both mentioned in the alternative. This is because either of the two reactants can be present in an amount greater than the other. In such a situation, the Group VIII metal compound need only be present in an amount stoichiometrically equivalent to the reactant present in the lesser amount to make a complete reaction possible.

As an alternative to the above, the reduced Group VIII metal compound can be separated from the reaction system and regenerated to a higher oxidation state by methods known in the art. Returning the regenerated Group VIII metal compound to the reaction system would enable it to perform in a manner which more closely approximates catalytic activity.

Another embodiment of this invention comprises conducting the reoxidation or regeneration of the Group VIII metal in situ. By including as a third component an oxidizing agent capable of reoxidizing the Group VIII metal compound to its higher valence as it is reduced during the reaction, the Group VIII metal compound can be made to function catalytically as long as there is sufficient oxidizing agent to cause its reoxidation. If the oxidizing agent is stoichiometrically equivalent to the aromtaic or olefinic compound, the reaction can proceed to completion with both the mercury, tallium or lead compound and the Group VIII metal compound functioning in a catalytic manner.

To be effective in the practice of this invention the oxidizing agent must have an oxidation potential more positive than the Group VIII metal employed under conditions at which the aromatic-olefin coupling reaction is carried out. Molecular oxygen under certain conditions may act as the oxidizing agent component of the catalyst system. A large number of other oxidizing agents are also suitable. Examples include nitric acid, alkali metal permanganates such as potassium permanganate, alkali metal dichromates, arsenous oxide, hydrogen sulfide, sodium thiosulfate and chlorine and bromine gas. One type of oxidizing agent preferred for use in this invention is one which functions as a redox agent under the reaction conditions employed. A redox agent is a compound which is capable of being oxidized by one substance in a reaction medium and reduced by another or vice versa, thereby being restored to its original oxidation state. Particularly preferred redox agents are those which can be readily reoxidized to their original state by molecular oxygen. In general, any multivalent metal salt having an oxidation potential more positive than the Group VIII metal, can be used as a redox agent in the process of this invention. In addition, the multivalent metal ion should preferably be present in the salt in a valence state higher than its lowest ionic valence state. The anions of such salts can be the same as, or similar to, the anions present in the mercury, thallium or lead compounds and Group VIII metal compounds, i.e. halides, nitrates, sulfates, carbonates, acetates and the like. The multivalent metal with the requisite oxidation potential can be copper, iron, manganese, cobalt, nickel, manganese cerium, uranium, chromium, molybdenum, vanadium and the like. Of the multivalent metal salts, the cupric and ferric salts are preferred. Examples of suitable redox compounds are cupric chloride, ferric bromide, manganese nitrate, cobalt sulfate, nickel formate, cerium acetate, uranium carbonate, chromium nitrate, molybdenum nitrate and vanadium propionate.

Other oxidizing agents can also be used to convert the Group VIII metal compound to catalytic, rather than stoichiometric, activity. Nitrogen oxides are examples of such redox agents. They can be used as the only redox agent in the reaction medium, or they can be used in combination with one or more of the previously mentioned multivalent metal salts. The oxides of nitrogen can be added in the vapor stage to the reaction medium as nitric oxide, nitrogen dioxide, nitrogen tetroxide or in the form of salts which generate the nitrogen oxides such as sodium nitrate, potassium nitrite and the like.

The most preferred embodiment of this invention comprises conducting the aromatic-olefin coupling reaction in the presence of the three metallic components of the catalyst system, i.e. the mercury, thallium or lead compound, the Group VIII metal compound, and the multivalent metal redox compound, and in the presence of a molecular oxygen-containing gas. In this embodiment the reaction is catalytic with respect to all three metallic components. Another way of considering this preferred embodiment is that is comprises the oxidative coupling of aromatic compounds to olefins according to the following exemplary reaction:

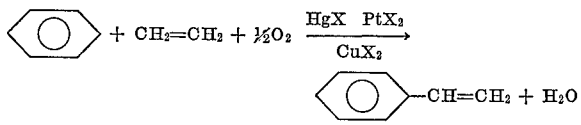

Viewed in this manner, the oxygen is not a component of the catalyst but rather one of the reactants whose reaction with aromatic and olefinic compounds is catalyzed by the three component catalyst system.

The components of the catalyst system can be used in widely varying amounts. If the Group VIII metal compound is used stoichiometrically with only the mercury, thallium or lead compound and the aromatic or olefinic reactants, and if the Group VIII metal compound is consumed by the reaction, then it should be present in an amount stoichiometrically equivalent to the quantity of aromatic compound or olefinic compound to be coupled. If the Group VIII metal compound functions catalytically as in other embodiments described hereinabove, the amount of compound can be far less, ranging from a concentration in the reaction mixture of 0.001 molar or less up to 5 molar or more, preferably from about 0.005 to about 1 molar.

If an oxidizing agent capable of oxidizing the Group VIII metal compound is employed in a non-catalytic manner, then it should preferably be present in an amount stoichiometrically equivalent to the quantity of aromatic compound or olefin present to insure complete reaction, and more preferably slightly in excess of that amount. It can be appreciated, however, that less than the above amounts of oxidizing agent can be used if there is sufficient Group VIII metal compound present to complete the coupling reaction after the oxidizing agent is exhausted. Hence the smallest amount of oxidizing agent which can be used in a non-catalytic manner to provide a complete reaction is that amount, which when combined with the Group VIII metal compound, is stoichiometrically equivalent to the aromatic or olefinic reactant to be coupled. If the oxidizing agent is a redox agent which functions catalytically, the redox agent can be used in an amount from about one-tenth to several times the amount of the Group VIII metal compound on a molar basis, preferably from about 0.5 to about 20 times, and more preferably about 2 to about 10 times greater than the amount of Group VIII metal compound.

The quantity of mercury, thallium or lead compound which is used is also expressed in terms of the Group VIII metal compound. The molar ratio of mercury, thallium or lead compound to Group VIII metal compound is from about 1:10 to about 10:1, preferably from about 1:2 to about 2:1, and more preferably in approximately equimolar amounts.

The reaction may be run at any temperature, the maximum temperature limitation being that imposed by the thermal stability of the reactants. Preferred reaction temperatures are from 0 to 400° C., more preferably from about 30 to about 200° C. Reaction pressures are similarly not critical. In general, the reaction may be carried out at any pressure from less than one to several hundred atmospheres. Preferred pressures range from 1 to about 300 atmospheres. Particularly preferred pressures will depend upon the size of the reactor and how much space is available for the molecular oxygen. In a one liter reactor for instance where half of the reactor volume is available for oxygen, a pressure of 5 to 100 atmospheres of oxygen or air has been found useful.

In the catalytic method of operation, the reactants can be added to a reactor vessel to which a solution or dispersion of the catalyst mixture is also added. The mixture is brought to a desired temperature and pressure to form the coupled products. After the reaction is terminated, the products may be separated by conventional methods such as crystallization and distillation. If the stoichiometric mode is used, the reaction proceeds until either the aromatic reactant or the promoter compounds are completely reacted. After product separation, the promoter system can be regenerated by oxidation if desired.

EXAMPLE 1

Into a 300 ml. autoclave is placed 2 grams of palladium acetate, 3 grams of cupric acetate, 3 grams of mercuric acetate, 1 ml. of trifluoroacetic acid, 60 ml. of benzene and 25 ml. of acetic acid. The autoclave is sealed, the temperature is raised to 50° C., and the autoclave is pressured to 50 p.s.i.g. with ethylene gas. While maintaining the temperature at 50° C. with stirring, oxygen is intermittently supplied to the autoclave in 10 p.s.i.g. increments at a frequency which keeps the total autoclave pressure between about 40 and 60 p.s.i.g. After ten hours, the autoclave is cooled, vented and opened. Gas-liquid chromatography identifies styrene and stilbene as the reaction product. The two reaction products are provided in a yield of about 30%.

EXAMPLE 2

Into a 300 ml. autoclave equimolar amounts of palladium acetate, cupric acetate and mercuric acetate are added in an amount sufficient to make each of the metallic acetate compounds 0.02 molar in 60 ml. of benzene and 20 ml. of acetic acid. Styrene is added in an amount sufficient to make the reaction mixture $\frac{1}{10}$ molar in styrene. The reactor is heated to 75° C. and pressured to 25 p.s.i.g. with oxygen. The oxygen is fed continuously to the reactor as it is consumed to maintain the pressure. After 6 hours, the reactor is cooled and vented. Trans-stilbene is isolated from the reaction mixture in 70% yield (95% selectivity based on styrene). The reaction rate is calculated to be .06 moles per liter per hour.

EXAMPLE 3

In a reactor similar to the one described in Example 2 and following the procedure set forth in Example 2, the palladium acetate is replaced with rhodium trichloride trihydrate. Trans-stilbene is produced in 8% yield (70% selectivity based upon the styrene) at a rate of 0.0006 moles per liter per hour.

EXAMPLE 4

Into a 300 ml. autoclave a benzene solution which is 0.02 molar with respect to mercuric acetate, to palladium acetate, and to cupric acetate is added. To the benzene solution 1 gram of sodium trichloroacetate is also added. The reactor is sealed and heated to 50° C., after which time 0.01 mole of styrene is added and the reactor pressured to 45 p.s.i.g. with oxygen. After 6 hours, the reactor is cooled and vented. Stilbene is produced in 60% yield with 99% selectivity based upon the styrene.

EXAMPLE 5

To 100 ml. of benzene 1 ml. of trifluoro acetic acid, and 0.001 mole of each of mercuric acetate, palladium acetate and cupric acetate are added. The benzene solution is placed in a 300 ml. autoclave and heated to 150° C. p-Methylstyrene is added and the reactor is pressured to 25 p.s.i.g. with oxygen. After 6 hours, the reactor is cooled and vented and paramethyl stilbene is produced at a rate of 0.2 moles per liter per hour.

EXAMPLE 6

Following the procedure of Example 5, palladium black is substituted for palladium acetate. p-Methylstilbene is produced in 20% yield.

EXAMPLE 7

The procedure of Example 5 is followed except that bis(trifluoroacetate) palladium, pd (OOCF$_3$)$_2$ is used in place of palladium acetate. Gas-liquid chromatographic analysis indicates that p-methylstilbene is produced in good yield.

EXAMPLE 8

A quantity of 94 grams of phenol, 86 grams of vinyl acetate, 350 grams of acetic acid, 0.3 grams of lead acetate and 0.3 grams of platinum acetate are mixed together and heated to reflux temperature for a period of 6 hours. As soon as refluxing begins, a saturated aqueous solution of potassium permanganate is added drop-wise at a rate which results in the addition of 35 grams of the permanganate over a 5.5 hour period. The reaction mixture is filtered. Gas-liquid chromatographic analysis identifies ortho- and parahydroxy phenyl vinyl acetate as the principal reaction products.

I claim:

1. A process for coupling an aromatic compound having a maximum of one alkyl or alkenyl group having up to two carbon atoms attached to the aromatic ring with an olefinic compound having a maximum of one alkyl group having up to two carbon atoms attached to one of the doubly bonded carbon atoms comprising reacting said compounds with oxygen in the presence of a catalyst system comprising a mercury, thallium or lead salt, a Group VIII metal salt and a redox agent.

2. A process according to Claim 1 wherein molecular oxygen is present in an amount at least stoichiometrically equivalent to the aromatic or olefinic compound, thereby making the reaction catalytic with respect to the mercuric compound, the Group VIII metal or metal compound and the redox compound.

3. A process according to Claim 1 wherein said catalyst system comprises a mercuric salt, a palladium salt and a redox agent which is a cupric or ferric salt.

4. A process according to Claim 1 wherein said catalyst system comprises mercuric acetate, palladium acetate and cupric acetate.

5. A process according to Claim 4 wherein said aromatic compound is benzene and said olefinic compound is ethylene.

6. A process for coupling an aromatic compound having a hydrogen atom attached to an aromatic ring with an olefinic compound having a hydrogen atom attached to a doubly bonded carbon atom comprising reacting said compounds with oxygen in the presence of a catalyst system comprising a mercury, thallium or lead salt, a Group VIII metal salt and a redox agent.

References Cited

UNITED STATES PATENTS

| | | | |
|---|---|---|---|
| 3,689,583 | 9/1972 | Kominami et al. | 260—669 R |
| 3,574,777 | 4/1971 | Heck | 260—671 A |
| 3,658,917 | 4/1972 | Heck | 260—671 A |
| 3,700,727 | 10/1972 | Heck | 260—669 R |

CURTIS R. DAVIS, Primary Examiner

U.S. Cl. X.R.

260—479 R, 668 C, 669 R, 671 A